United States Patent [19]

Irwin

[11] 4,169,876
[45] Oct. 2, 1979

[54] PROCESS FOR SPINNING FLAME-RESISTANT ACRYLONITRILE POLYMER FIBERS

[75] Inventor: Robert S. Irwin, Wilmington, Del.

[73] Assignee: E. I. Du Pont de Nemours and Company, Wilmington, Del.

[21] Appl. No.: 899,295

[22] Filed: Apr. 24, 1978

[51] Int. Cl.$^2$ ............................................. D01F 6/18
[52] U.S. Cl. ..................................... 264/206; 264/211
[58] Field of Search ..................... 264/206, 182, 211; 260/29.2 AN, 28.5 R; 106/15 FP

[56] References Cited

U.S. PATENT DOCUMENTS 4,077,929  3/1978  Robinson ..................... 260/29.6 AN

FOREIGN PATENT DOCUMENTS 50-3821  2/1975  Japan ........................................ 264/182

Primary Examiner—Jay H. Woo

[57] ABSTRACT

An improved process for spinning flame-resistant acrylonitrile polymer fibers wherein 33–43% by weight (preferably 35–40% by weight) of a chlorinated acyclic hydrocarbon containing 60–73% (preferably 66–70%) by weight chlorine and 57–67% (preferably 60–65%) by weight of an acrylonitrile polymer having an intrinsic viscosity of 1.6–3 (preferably 1.8–2.2) is dissolved in a suitable solvent to form a solution containing 25–31% by weight solids which solution is extruded under conventional dry spinning conditions to give fibers which are extracted, drawn and dried. Optionally, the spinning solution also contains 0.5–6% (preferably about 3%) by weight antimony trioxide based on total solids.

5 Claims, No Drawings

PROCESS FOR SPINNING FLAME-RESISTANT ACRYLONITRILE POLYMER FIBERS

BACKGROUND OF THE INVENTION

This invention relates to an improved dry spinning process for the preparation of flame-resistant acrylonitrile polymer fibers containing a chlorinated acyclic hydrocarbon and optionally antimony trioxide.

Many fabrics, particularly those used in children's sleepwear, are required by law to be flame resistant. Modacrylic fibers made from acrylonitrile polymers containing 35 or 40% by weight of one or more halogen-containing monomers have seen commercially sold as providing the required flame resistance. However, such fibers are relatively expensive to manufacture. Further, modacrylic fibers are not equivalent in all their properties to acrylic fibers.

Addition of chlorinated hydrocarbons to acrylonitrile polymers for the purpose of improving the flame resistance of acrylonitrile polymer fibers is known as is joint use of these chlorinated hydrocarbons and antimony trioxide.

It has been found that chlorinated hydrocarbons and antimony trioxide (and alternatively other additives such as tin, zinc or other antimony compounds, and other reagents known in the art to be synergistic with chlorine compounds in providing flame resistance) can be incorporated into spinning solutions of acrylic or modacrylic polymers. However, if conventional acrylonitrile polymers having an intrinsic viscosity of about 1.4 are used, only about 32% by weight chlorinated hydrocarbons based on fiber weight can be spun with any reasonable continuity of spinning. This amount of chlorinated hydrocarbon, even when supplemented with antimony trioxide, does not provide a high degree of flame resistance in that the fabrics containing such fibers do not pass the vertical flame test (for example DOC FF 3-71—Children's Sleepwear Test). In order to pass the vertical flame test, acrylonitrile polymer fibers should contain 33-43% by weight well dispersed chlorinated hydrocarbon, depending on the amount of chlorine in the chlorinated hydrocarbon and the amount of antimony trioxide present.

This invention provides an improved process for spinning flame-resistant acrylonitrile polymer fibers wherein 33-43% by weight of a chlorinated acyclic hydrocarbon containing 60-73% by weight chlorine and 57-67% by weight of an acrylonitrile polymer having an intrinsic viscosity of 1.6-3 is dissolved in a suitable solvent to form a solution containing 25-31% by weight solids which solution is extruded under conventional dry spinning conditions to give fibers which are extracted, drawn and dried. Preferably, the spinning solution also contains antimony trioxide in an amount of 0.5-6% by weight of the total solids. It is preferred that the acrylonitrile polymer is an acrylic polymer having an intrinsic viscosity of 1.8-2.2. Most preferably, 35-40% by weight of a chlorinated acyclic hydrocarbon containing 66-70% by weight chlorine is used. Preferably, 60-65% by weight of the total solids in the solution spun is acrylonitrile polymer.

The chlorinated hydrocarbons employed in the present invention are low melting solids which are available commercially. They are made by chlorinating acyclic hydrocarbons to form a product which has an average of about 16-30, preferably 23-27, carbon atoms per molecule, as determined in the product as chlorinated. Since it is desired to introduce a substantial amount of organo-substituted chlorine in the mixture by the use of this additive, the minimum chlorine content of the chlorinated hydrocarbon is about 60% by weight; and the maximum useful chlorine content for dry spinning is about 73% by weight. The preferred starting materials are substantially straight-chain hydrocarbons and the preferred chlorine content is in the range of about 66-70% by weight. A highly suitable material is a chlorinated paraffin having a melting point of about 115° C., containing approximately 25 carbon atoms, and having a chlorine content of about 67% by weight.

Any suitable inert organic solvent for acrylonitrile polymer may be employed. Preferred solvents are dimethylformamide and dimethylacetamide. Other examples include dimethylsulfoxide and butyrolactone. Normally the chlorinated hydrocarbon is mixed with the solvent first and brought into solution by heating and stirring. The appropriate amount of the acrylonitrile polymer, as further defined below, is then added and heating and stirring of the mixture is continued until a good solution of the components is formed.

The ratio of the amount of chlorinated hydrocarbon used to the amount of acrylonitrile polymer will depend upon the concentration of the chlorinated hydrocarbon desired in the fiber product. The higher the amount of chlorinated hydrocarbon in the fiber, the more flame resistant the fiber is. However, there is a limit to the total solids (polymer, chlorinated hydrocarbon and any synergistic additive) level at which a single phase can be maintained in the solution of the chlorinated hydrocarbon, acrylonitrile polymer, and inert organic solvent. Moreover, as the level of chlorinated hydrocarbon increases, the total solids level at which a single phase can be maintained decreases.

For instance, with acrylonitrile polymers having an intrinsic viscosity of 1.6 to 3 and dimethylformamide as solvent, when the chlorinated hydrocarbon amounts to 33% by weight of the fiber product, the total solids level in the solution which can be maintained as a single phase is only about 31% by weight. When the total solids level is 32% by weight and the chlorinated hydrocarbon comprises 33% or more by weight of the total solids, a second phase forms and the two-phase solution is not spinnable. When the chlorinated hydrocarbon is increased to 43% by weight of the fiber, the total solids level maintainable as a single phase is only about 25% by weight.

The acrylonitrile polymers used in the process of this invention are defined as long chain synthetic polymers composed of acrylonitrile units of the formula

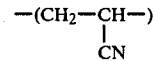

in the polymer chain, the intrinsic viscosity of the polymer being in the range 1.6-3 (preferably 1.8-2.2). Herein, the term "acrylonitrile polymer" includes the homopolymer of acrylonitrile (i.e., polyacrylonitrile) and copolymers of at least 60% by weight of acrylonitrile and up to 40% by weight of one or more suitable monoethylenically unsaturated monomers copolymerizable with acrylonitrile. The term "acrylic polymer" includes the homopolymer of acrylonitrile and copolymers of at least 85% by weight of acrylonitrile and up to 15% by weight of one or more suitable monoethylenically unsaturated monomers copolymerizable with acrylonitrile. Typical monomers which are copolymerizable with acrylonitrile are methyl acrylate, vinyl chloride, styrene, methylvinylpyridine, sodium styrenesulfonate, sodium 2-acrylamido-2-methylpropanesulfonate, and sodium methallysulfonate. Although the process of the invention is applicable to the modacrylic polymers containing 60–85% by weight acrylonitrile units, the preferred starting materials are the acrylic polymers.

In accordance with the present invention, it has been found that spinnable solutions of acrylonitrile polymer containing from 33 to 43% chlorinated hydrocarbon (based on total solids) can be prepared by using an acrylonitrile polymer having an intrinsic viscosity in the range of about 1.6 to 3. Best results are obtained by using an acrylonitrile polymer having an intrinsic viscosity of at least about 1.8, and polymers having an intrinsic viscosity above about 2.2 are generally more expensive to make in commercial practice; hence, the preferred range of intrinsic viscosity is from 1.8 to 2.2.

The polymer employed for dry spinning of conventional acrylic fibers in current commercial practice, which has an intrinsic viscosity of about 1.4, is not suitable for use as a starting material in the present invention. When acrylonitrile polymer having an intrinsic viscosity of only 1.4 is used, the maximum amount of chlorinated hydrocarbon which can be incorporated is only about 32% by weight (based on fiber weight). When more than about 32% by weight of the chlorinated hydrocarbon is added to the spinning solution, the total solids content of the spinning solution either becomes so high that the solution separates into two phases, or the concentration of acrylonitrile polymer in the solution must be reduced by adding more solvent. In either case, the solution obtained is unsuitable for good continuity of spinning.

Antimony oxide in the amount of 0.5–6%, based on the weight of the fiber product, is preferably added to the spinning solution to enhance the flame resistance of the fiber in cooperation with the chlorinated acyclic hydrocarbon. The optimum amount of antimony oxide is about 3% by weight, since higher amounts tend to deluster the fiber excessively while lower amounts do not confer as much flame resistance.

TEST METHODS

Intrinsic Viscosity

The intrinsic viscosity of acrylonitrile polymer is determined by experimentally measuring the relative viscosity of an 0.2% solution of the polymer in a solvent comprising an 0.02 molar solution of lithium bromide in dimethylformamide and converting the measured relative viscosity value to the corresponding intrinsic viscosity value. The solvent is prepared by weighing out 17.2±0.1 g. of dry lithium bromide and dissolving it in 10 liters±100 ml. of dimethylformamide (DMF) having a water content not greater than 0.06%. The acrylonitrile polymer sample is dried at 121° C. for 30–35 minutes, and the sample of the dry polymer is ground in a mortar until a fine powder results. A quantity of 0.05±0.0002 g. of the dry powder is weighed out and placed in a 25 ml. volumetric flask with approximately 10 ml. of the DMF-LiBr solution, shaken for no more than eight minutes, and heated and shaken for an additional five minutes if necessary to dissolve any undissolved polymer. The flask is cooled, filled almost to the volumetric mark, shaken, and placed on a 25° C. water bath for ten minutes. The flask is then diluted further to the exact volumetric mark with DMF-LiBr solution at 25° C., and filtered. Duplicate samples of the sample polymer solution at 25° C. are then drawn into viscometer pipettes, and the flow times for each sample of solution to pass from the first mark to the second mark in each pipette is determined to the nearest 0.1 second. Duplicate samples of the DMF-LiBr solution used as solvent (and containing no polymer) are then also drawn into the viscometer pipettes and the flow times for the solvent are also determined to 0.1 second. The relative viscosity, $\eta_r$, is then calculated from the equation $$\eta_r = T/T_o$$

where T is the average viscometer flow time in seconds for the sample solution and $T_o$ is the average viscometer flow time in seconds for the solvent. The intrinsic viscosity, $(\eta)$, is defined as limit ln $\eta_r/C$ as C approaches 0 where C is the concentration in grams of the polymer per 100 cc of solution. The conversion of the relative viscosity value, $\eta_r$, to the intrinsic viscosity value, $(\eta)$, is usually made by the use of previously prepared conversion tables where intrinsic viscosity determination values are routinely requested from an analytical laboratory.

EXAMPLE I

To 1568.5 ml. of dimethylformamide was added, with stirring, 242 g. of a solid chlorinated paraffin having a chlorine content of 67.7% chlorine and containing an average of about 25 carbon atoms per molecule. To the resulting solution was added 329 g. of acrylonitrile (AN)/methyl acrylate (MA)/sodium styrenesulfonate (SSS), (94/5.9/0.1) terpolymer having an intrinsic viscosity of 1.97. The mixture, upon being heated with stirring for an hour at 75° C. or slightly higher, formed a good solution. To the solution was added 59 g. of a dimethylformamide slurry containing 30 weight % antimony oxide and 5 weight % of the same AN/MA/SSS terpolymer. The resulting mixture contained 27.7 weight % solids. Based on the total solids, the mixture contained 40.9% of the chlorinated hydrocarbon and 3.0% antimony oxide.

The mixture thus prepared was spun continuously through orifices having a diameter of 0.15 mm. The temperature of the spinning solution was 127°–128° C., the gas temperature was 229° C. and the cell temperature was 180°±1° C. Good stability of spinning was observed. The spun filaments were collected at a rate of 250 ypm (228.5 mpm) as a bundle of 18 filaments having a linear density of 161 denier (178.7 dtex) on a dry weight basis. The filaments were readily drawable and appeared capable of being drawn up to 4.5×. In a specific run, the filament bundle was drawn 3.5× in a single bath wash draw vessel at 95° C., the input speed being about 15 ypm (13.7 mpm) and the length of the filament path in the vessel being about 6 ft. 6 in. (1.98 meters). The drawn filament bundle was crimped in a stuffer box crimper to a crimp of about 10–12 cpi (3.9–4.7 crimps per cm), cut in a Beria cutter to a 1.5-inch (3.8 cm) cut length, and dried at 140° C. for 20 minutes. The fibers had a denier of 3.13 (3.48 dtex), a tenacity of 1.42 gpd (1.25 decinewtons per tex), an elongation of 27.1%, and a modulus of 36.5 gpd (32.1 decinewtons per tex).

I claim:

1. A process for spinning flame-resistant acrylonitrile polymer fibers wherein 33–43% by weight of a chlorinated acyclic hydrocarbon containing 60–73% by weight chlorine and 57–67% by weight of an acrylonitrile polymer having an intrinsic viscosity of 1.6–3 is dissolved in a suitable solvent to form a solution containing 25–31% by weight solids which solution is extruded under conventional dry spinning conditions to give fibers which are extracted, drawn and dried.

2. A process of claim 1 wherein the spinning solution also contains antimony trioxide in an amount of 0.5–6% by weight of the total solids.

3. A process of claim 1 wherein the acrylonitrile polymer is an acrylic polymer having an intrinsic viscosity of 1.8–2.2.

4. A process of claim 3 wherein the chlorinated acyclic hydrocarbon contains 66–70% by weight chlorine.

5. A process of claim 1 wherein 35–40% by weight chlorinated acyclic hydrocarbon is used.

* * * * *